United States Patent
Lain

(10) Patent No.: US 9,720,675 B2
(45) Date of Patent: Aug. 1, 2017

(54) VERSION MISMATCH DELAY AND UPDATE FOR A DISTRIBUTED SYSTEM

(75) Inventor: Antonio Lain, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 578 days.

(21) Appl. No.: 12/913,597

(22) Filed: Oct. 27, 2010

(65) Prior Publication Data

US 2012/0109914 A1    May 3, 2012

(51) Int. Cl.
*G06F 9/445* (2006.01)

(52) U.S. Cl.
CPC ........................ *G06F 8/65* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,951,670 | A * | 9/1999 | Glew et al. | 712/23 |
| 6,718,351 | B2 * | 4/2004 | Sellen et al. | |
| 7,624,155 | B1 * | 11/2009 | Nordin et al. | 709/208 |
| 2002/0087876 | A1 * | 7/2002 | Larose | 713/200 |
| 2003/0145315 | A1 * | 7/2003 | Aro et al. | 717/170 |
| 2003/0236970 | A1 * | 12/2003 | Palmer et al. | 713/1 |
| 2004/0088652 | A1 * | 5/2004 | Abe et al. | 715/513 |
| 2006/0184930 | A1 | 8/2006 | Fuente et al. | |
| 2007/0208790 | A1 | 9/2007 | Reuter et al. | |
| 2008/0034362 | A1 * | 2/2008 | Hayama et al. | 717/174 |
| 2008/0222515 | A1 * | 9/2008 | Burns | 715/236 |
| 2011/0055811 | A1 * | 3/2011 | Ananthanarayanan et al. | 717/120 |

OTHER PUBLICATIONS

Ajmani Sameer; "A Review of Software Upgrade Techniques for Distributed Systems" MIT Computer Science and Artificial Intelligence Laboratory; Cambridge MA, Nov. 7, 2004.
Wu et al.; "On a Dynamic Software Update Framework for Messaging Oriented Middleware Services"; Research Paper, pp. 6521-6524; Publication date: Sep. 21-25, 2007.
Ryu "Supporting the Dynamic Evolution of Web Service Protocols in Service-Oriented Architectures" ACM Transactions on the Web, vol. 2, No. 2, Article 13, Publication date: Apr. 2008.
Soap Header Element—online www.w3schools.com/soup/soup_hearder.asp—3 pages.
Wikipedia—"Protocol Buffers"—online Protocol Buffers—Wikipedia, the free encychlopedia—3 pates.

* cited by examiner

*Primary Examiner* — Thu Nga Nguyen
(74) *Attorney, Agent, or Firm* — Hewlett Packard Enterprise Patent Department

(57) ABSTRACT

Illustrated is a system and method to receive an instruction to access a set of identified data structures, where each identified data structure is associated with a version data structure that includes annotations of particular dependencies amongst at least two members of the set of identical data structures. The system and method further comprising determining, based upon the dependencies, that a version mismatch exists between the at least two members of the set of identified data structures, the dependencies used to identify a most recent version and a locally cached version of the at least two members. The system and method further comprising delaying execution of the instruction until the version mismatch between the at least two members of the set of identified data structures is resolved through an upgrade of a version of one of the at least two members of the set of identified data structures.

18 Claims, 7 Drawing Sheets

VERSION MISMATCH DELAY AND UPDATE FOR A DISTRIBUTED SYSTEM

BACKGROUND

Given the prevalence of multi-node computing systems that implement distributed software systems, there are a number of solutions for ensuring the forward and backward compatibility of these distributed software system. Issues of forward and backward compatibility most often arise when one wants to perform code upgrades while such systems are on-line. Forward compatibility allows an old node to handle interactions with a node that has already been upgraded. Backward compatibility ensures that a newly upgraded or updated node can handle interactions with old nodes. Achieving backward compatibility is a well-understood process that can be exemplified by how new word processors are able to read documents written with old versions of the same word-processing software. Example of (partial) solutions for ensuring forward (and backward) compatibility include GOOGLE™ Protocol Buffers, and the W3C™ standard Simple Object Access Protocol (SOAP) that implements a "mustUnderstand" header attribute. A further example solution includes the deployment, in parallel, of two or more complete and isolated multi-node computing systems, where one system executes the updated distributed software system and a second system that executes a legacy distributed software system.

BRIEF DESCRIPTION OF THE DRAWINGS

Some embodiments of the invention are described, by way of example, with respect to the following figures.

DETAILED DESCRIPTION

Figure 1:
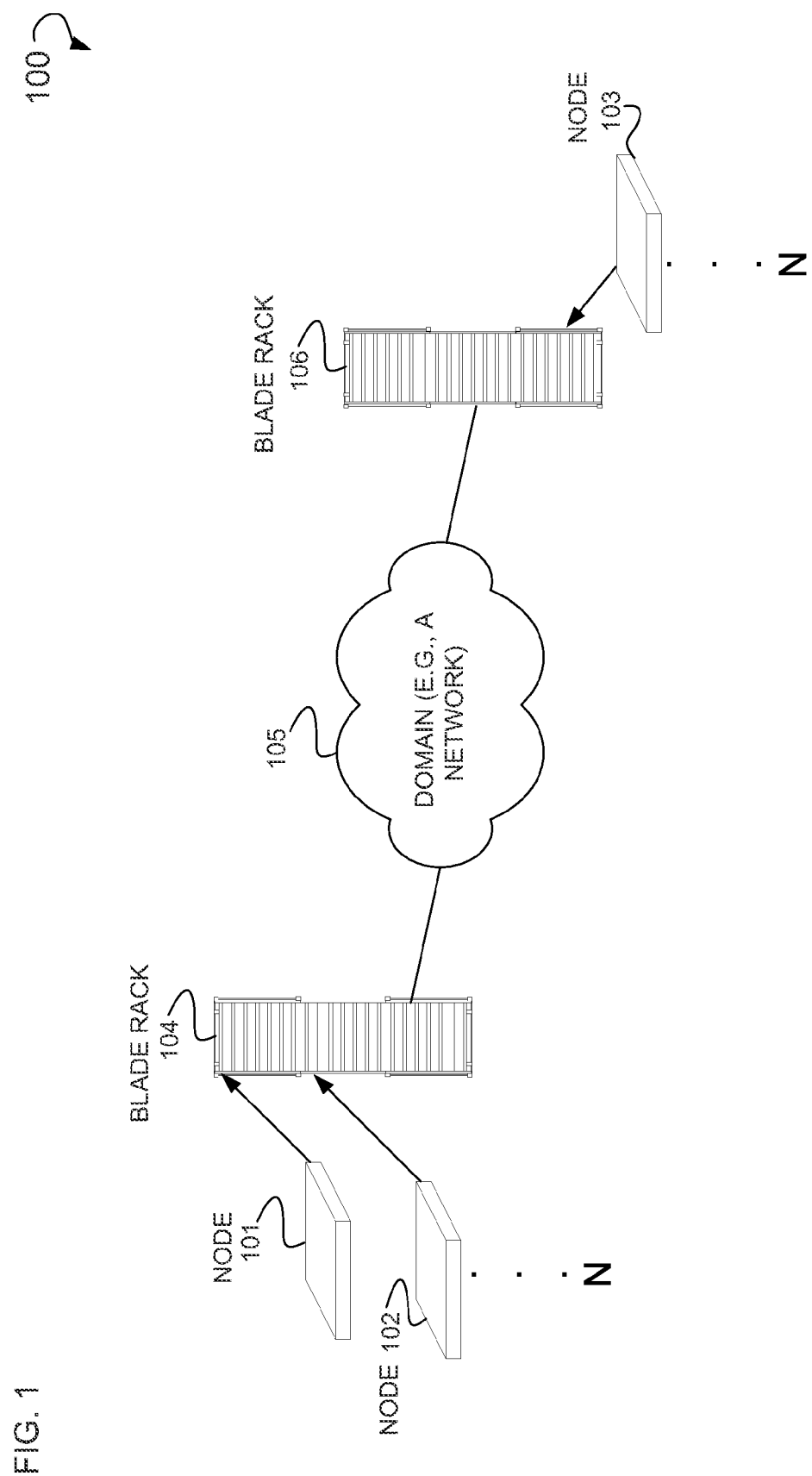
FIG. 1 is a diagram of a system, according to an example embodiment, for updating a distributed software system that is implemented across a plurality of nodes, the updating tracked using a version data structure that includes dependencies.

Illustrated is a system and method for updating a distributed software system that is implemented across a plurality of nodes, where this system and method for updating addresses issues of forward compatibility using data and functional dependencies. A distributed system is illustrated in which interactions between nodes can be captured by modifying data structures that are shared, and possibly locally replicated, across multiple nodes. As used herein, upgrade and update are used synonymously. A data structure, as used herein, is an abstract data type, static or dynamic variable, a function, an object class, a structure (struct), or a plurality of these data structure organized into a more complex data structure. These interactions may be in the form of update messages ("updates") that are transmitted, propagated across nodes to facilitate the modification of shared data structures. This transmission and propagation may be facilitated through the unicasting, multicasting, or broadcasting of updates. Additionally illustrated are program representations (e.g., code binaries or scripts) of functions accessing these data structures that can also be stored in those distributed data structures. By distributing updates across nodes, on-line code updates are performed in those nodes.

In some example cases, it may be impractical for a large distributed system to enforce consistency, while guaranteeing availability under node failures. For this reason, it cannot be ensured that replicated distributed data structures will provide the same strong consistency semantics as their shared-memory counterparts. To resolve this issue, as shown below, updates to data structures may be made visible to different nodes at different times. However, a single timeline of changes for a particular data structure is ensured by serializing (or merging) all modifications to that data structure, and thus ensuring a globally consistent version number for each data structure instance.

In some example embodiments, dynamic functional and data dependencies are exploited between distributed data structures to facilitate forward compatibility. For example, a functional dependency is implicitly created between the data structure that includes an access function implementation and the data structure that is accessed using that function. Further, a data dependency is created by reading as an argument, for a function, one data structure, when a function is applied to change another function or data structure that uses the same data structure. The data structures involved in such dependencies are addressed by an order pair containing a version number (e.g., "1") and a unique data structure identifier (e.g., [A, 1]). These data structure identifier pairs are organized into a version data structure that is used to illustrate causal dependencies between events. Additionally, this version data structure can be used to propagate and track both functional and data dependencies between data structures. In one example embodiment, the data structures are associated with, or decorated with, particular version data structures.

In some example embodiments, each node of the plurality of nodes is dedicated to receiving and transmitting updates for a particular data structure. These updates may either be a modification update or a refresh update. A modification update is an update to the version data structure that occurs as the result of the execution of code that accesses a data structure. A refresh update is an update to a local version of a data structure that is the result of changes triggered by a modification update that are transmitted and propagated across the plurality of nodes. Access, as used herein, may be a read or write operation.

In some example embodiments, the execution of the distributed software system, as it is executed on a node, is delayed where a version mismatch is determined to exist based upon dependencies. A version mismatch, as used herein, exists where the local version information and/or annotation information in the version data structure for a node is older than (e.g., prior to in the update history) the version information and/or annotation information in the version data structure for the node receiving and transmitting updates for a particular data structure. For example, if data structure "A" version "1" (e.g., [A, 1] as denoted in the version data structure) is dependent upon "F" version "1" to execute, yet the node executing "A" version "1" only has "F" version "0" residing locally, then a version mismatch exists. This mismatch is resolved by delaying the execution of "A" version "1" until a refresh update in the form of "F" version "1" is received. Instructions received after the delay is implemented, but before "F" version "1" is received, are stored (e.g., queued) for future execution after the update is received.

FIG. 1 is a diagram of an example system 100 for updating a distributed software system that is implemented across a plurality of nodes, the updating tracked using a version data structure that includes dependencies. Shown is a node 101 and 102 that reside as part of a blade rack 104. These nodes 101 and 102 are operatively connected to a node 103 via a domain 105. The node 103 resides in a blade rack 106. A node, as used herein, includes a computer system, compute blade or other device that has one or more processors and memory. A computing cluster may be used in lieu of a node(s) and rack. Operatively connected includes a logical or physical connection. A domain includes an internet, Wide Area Network (WAN), Local Area Network (LAN), or other suitable network and associated topology.

Figure 2:
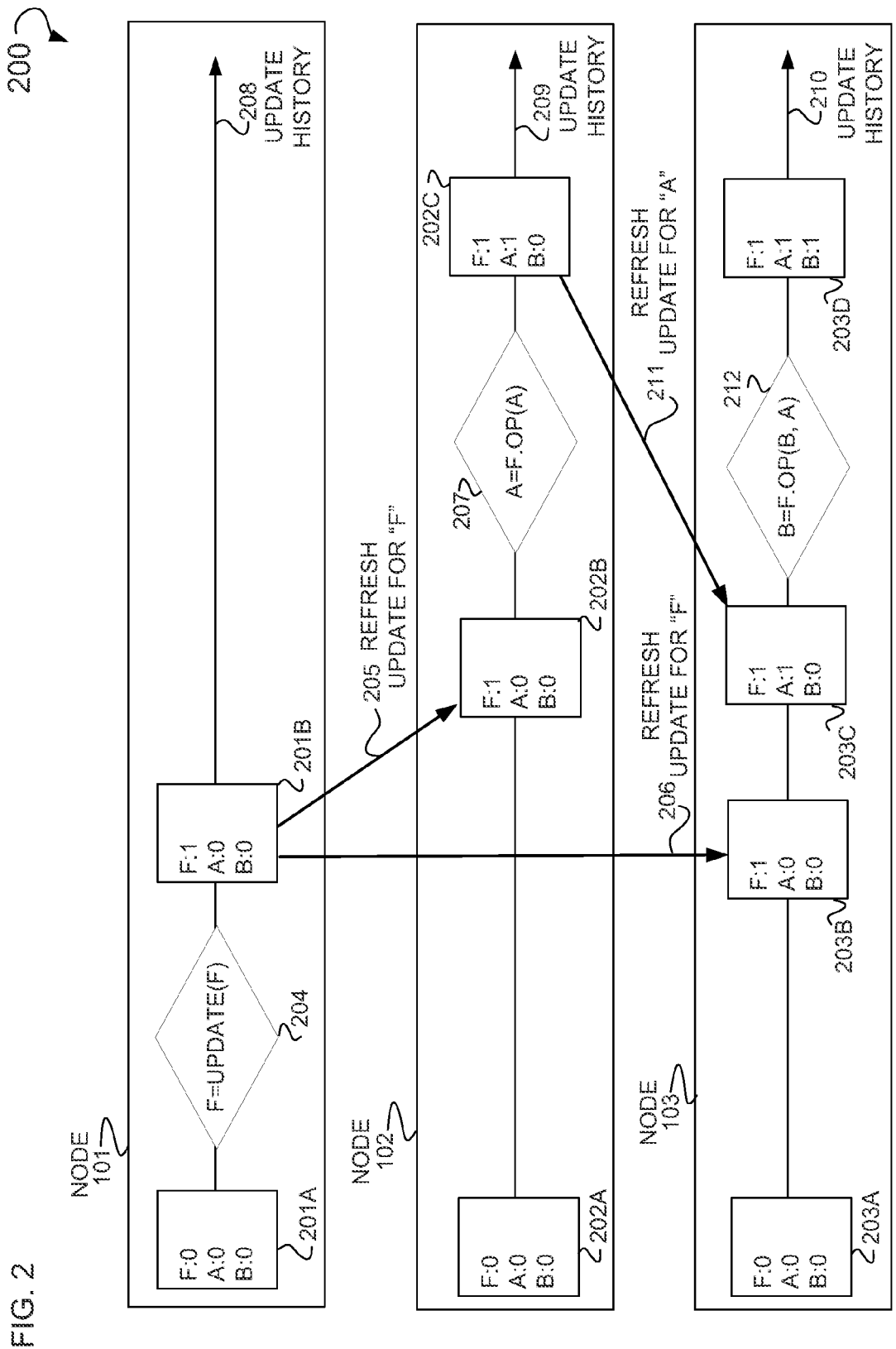
FIG. 2 is a diagram of a propagation sequence, according to an example embodiment, for a sequence of local modified updates followed by subsequence refresh updates transmitted across a distributed software system.

FIG. 2 is a diagram of a propagation sequence for a system 200 where there is a sequence of local modify updates followed by subsequent refresh updates transmitted across a distributed software system. Shown is a node 101 that includes an update history 208, a node 102 that includes an update history 209, and a node 103 that includes an update history 210. Residing on the node 101 is a version data structure 201A that includes locally cache version data and annotations regarding dependencies amongst a set of data structures. As illustrated via the operation 204 a computation is executed that creates a new modify update for a specific data structure. Here the "F" data structure is updated to a version "1." It is assumed that this update is globally and temporally unique. A version data structure 201B is shown that reflects this update for data structure "F". As shown at 205 and 206, this update for "F" is propagated across the nodes of the distributed software system as a refresh update. This refresh update is received by the version data structure 202B and 203B.

As shown on node 102, an operation 207 is executed as a computation to generate a new modify update to change data structure "A" to a version "1." As illustrated, a function called "op" is called as part of the data structure "F" to create a new value for "A" based upon the old value of "A." The old value of "A" reflected in the annotations for "A" and the dependencies included therein. Further, as illustrated at the version data structure 202C, a refresh update 211 is generated to update data structure "A" in the version data structure 203C from "0" to "1." Illustrated, as part of the node 103, is an operation 212 that is executed as a computation to update data structure "B" from a version "0" to a version "1." This update of "B" is reflected at the version data structure 203D.

Figure 3:
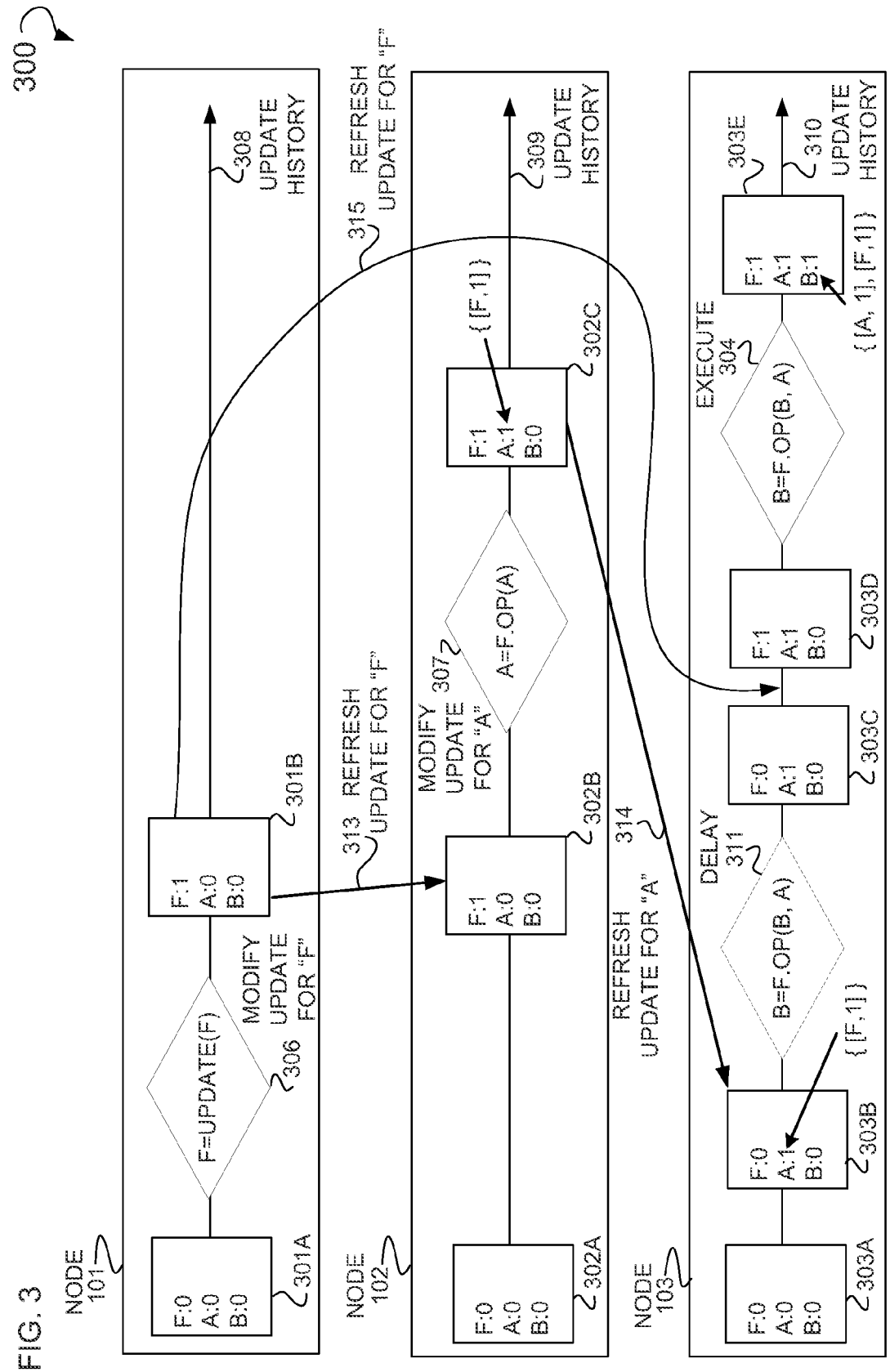
FIG. 3 is a diagram of a propagation sequence, according to an example embodiment, whereby through adding a version data structure that includes dependencies we can delay modify updates to simulate a processing order regardless of delays, in the propagation of refresh updates.

FIG. 3 is a diagram of a propagation sequence for a system 300 whereby through adding a version data structure that includes dependencies we can delay modify updates to simulate a processing order regardless of delays in the propagation of refresh updates. Shown is a node 101 that includes an update history 308, a node 102 that includes an update history 309, and a node 103 that includes an update history 310. Residing on the node 101 is a version data structure 301A that includes locally cache version data and annotations regarding dependencies amongst a set of data structures. An operation 306 is executed as to generate a new modify update to change data structure "F" to a version "1." As illustrated at 313 and 315, the version data structure 301B propagates a fresh update for "F" to the version data structure 302B and 303D. Version data structure 302B, generated from the version data structure 302A, is modified via the execution of operation 307 to generate a version data structure 302C. Operation 307 is executed to facilitate a modification update of data structure "A" using the function "op" of "F" version "1". The use of "F" version "1" to generate "A" version "1" (i.e., the dependency between "F" and "A") is reflected in an annotation illustrated in 302C as [F, 1]. As shown at 314, a refresh update for "A" is propagated by the node 102 from the version data structure 302C, and received at node 103 to be stored into the version data structure 303B.

Version data structure 303B is generated from the version data structure 303A and includes the annotation [F, 1] as provided by the refresh update for "A," illustrated at 314. As illustrated at 311, a delay is executed where a modify upgrade is attempted of data structure "B," but "B" is dependent upon "A" version "1" that in turn is dependent upon "F" version "1". A local version of "F" version "1" does not exist on node 103, accordingly the modify update is delayed. The instruction seeking to update data structure "B" is queued pending the update of "F" being received as a refresh update. As illustrated at 315, at some point in time, a fresh update for "F" is received and noted in the version data structure 303D. Upon receipt of the refresh update, the modify update operation 304 is de-queued and executed so as to generate the modify update for "B." The dependencies for "B" version "1" are stored as annotations (i.e., {[A, 1], [F, 1]} into the version data structure 303E.

Figure 4:
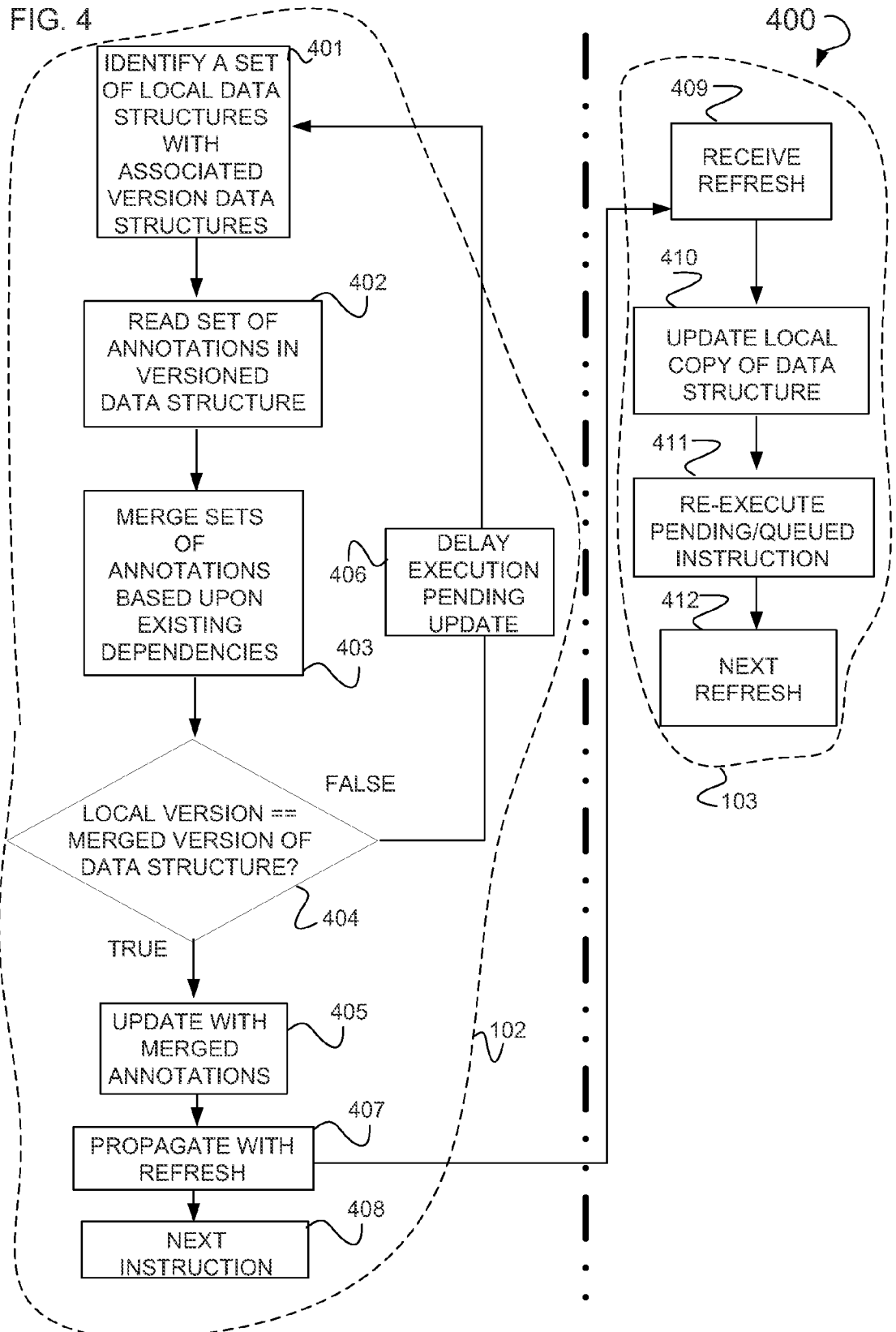
FIG. 4 is a dual-stream flow chart illustrating a method, according to an example embodiment, executed to update a distributed software system that is implemented across a plurality of nodes, the updating tracked using a version data structure that includes dependencies.

FIG. 4 is a dual-stream flow chart illustrating a method 400 executed to update a distributed software system that is implemented across a plurality of nodes, the updating tracked using a version data structure that includes dependencies. Shown are operations 401-408 that are executed by the node 102. Also shown are operations 409-412 that are executed by the node 103. Operation 401 is executed to identify a set of local data structures ("S") with an associated version data structure ("Ki"). Associated, as used herein, included embedded in, mapped to, or otherwise related. "Ki" is considered to reside locally within "S", if and only if, there is a locally cached replica or instantiation of "Ki" with a version "Vi." Specifically, an ordered pair locally exists as part of the version data structure. This relationship between "S", "Ki" and "Vi" can be represented as follows:

$$(Ki, Vi) \in Local(S)$$

Operation 402 is executed to read the set of annotation in the versioned data structure. The annotations include the various dependencies between the data structures. These annotations may be formatted as a data type, data structure, a flat file, eXtensible Markup Language (XML) formatted file, or some other suitable format. Operation 403 is executed to merge sets of annotations based upon existing dependencies. This merge operation is executed as a series of union (∪) operations of previously merged sets, where the elementary merge operations are defined between ordered pairs included in the version data structure. This merge operation can be represented as follows, where P represents a previously merged set and (Ki,Vi) an ordered pair in another previously merged set that we want to merge with P:

Merge((Ki,Vi),P), where ∀(Kr,Vr)∈P∪Merge((Ki,Vi), (Kr,Vr))

The elementary merge operation of two ordered pairs (Ki, Vi) and (Kr, Vr) is obtained by comparing Ki with Kr and if they are the same returning the set {(Ki, Max(Vi,Vr))}— where Max returns the most recent version—and otherwise returning the set containing both original pairs. Decision operation 404 is executed to determine whether the local version of the data structure is equal to the merged version of the data structure containing all its previously known dependencies. This decision operation 404 can be represented as follows:

∀Si∈S,∃(Si,Vi)∈Local(S) and Vi≥Version(Dependencies(S),Si), where Dependencies(S) is obtained by merging all the annotations contained in the versioned data structures identified by Local(S), and the function Version(Dependencies(S),Si) will extract from that set the version identifier paired to Si.

In cases where decision operation 404 evaluates to "false," an operation 406 is executed to delay the execution of the data structure pending the receiving of a refresh update. In cases where decision operation 404 evaluates to "true," an operation 405 is executed. Operation 405 updates the version data structure with the merged annotations. Operation 407 is executed to propagate the refresh update via a transmission to other nodes of the refresh update. Operation 408 is executed to increment to the next instruction to be executed. Operation 409 is executed to receive the refresh update. Operation 410 is executed to update a local copy of the data structure. Operation 411 is executed to re-execute pending/queued instructions. Operation 412 is executed to increment to the next data structure to be refreshed.

Figure 5:
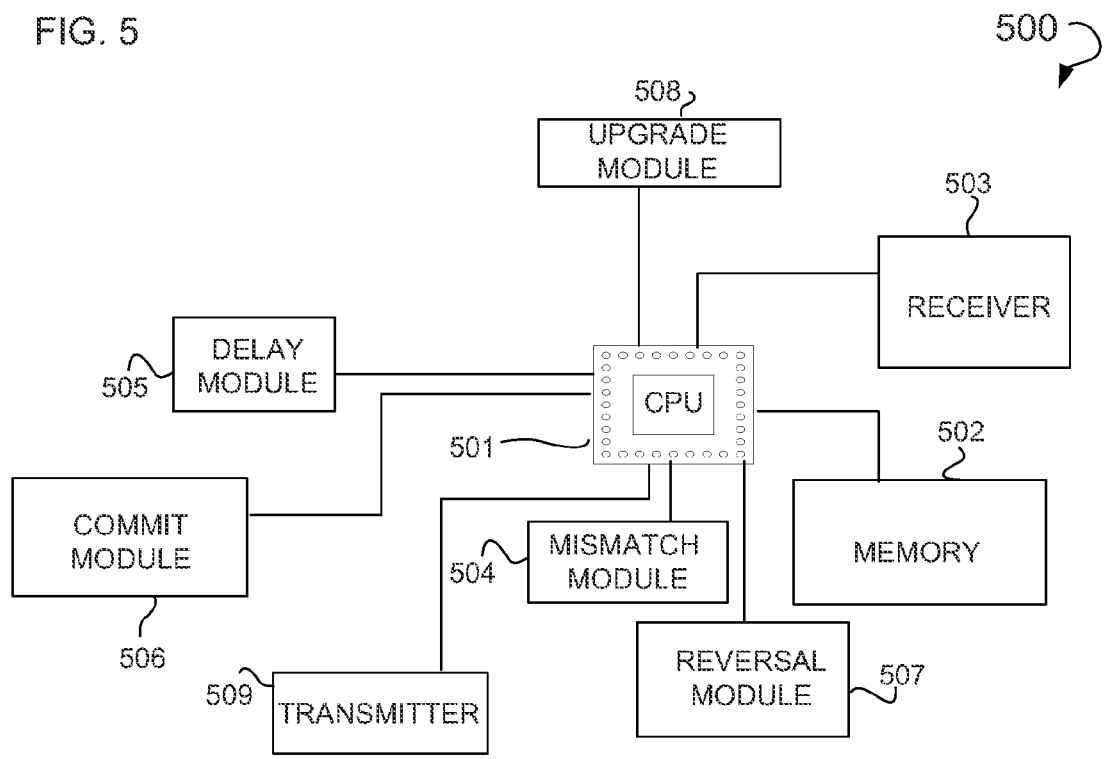
FIG. 5 is a block diagram of a system, according to an example embodiment, for updating a distributed software system that is implemented across a plurality of nodes, the updating tracked using a version data structure that includes dependencies.

FIG. 5 is a block diagram of a system 500 for updating a distributed software system that is implemented across a plurality of nodes, the updating tracked using a version data structure that includes dependencies. The blocks may be implemented in hardware, firmware, or software. These blocks may be operatively connected via a logical or physical connection. The node 101 is an example of the system 500. Shown is a Central Processing Unit (CPU) 501 that is operatively connected to a memory 502. Operatively connected to the CPU 501 is a receiver 503 to receive an instruction to access a set of identified data structures, where each identified data structure is associated with a version data structure that includes annotations of particular dependencies amongst at least two members of the set of identical data structures. Operatively connected to the CPU 501 is a mismatch module 504 to determine, based upon the dependencies, that a version mismatch exists between the at least two members of the set of identified data structures, the dependencies used to identify a most recent version and a locally cached version of the at least two members. Operatively connected to the CPU 501 is a delay module 505 to delay execution of the instruction until the version mismatch between the at least two members of the set of identified data structures is resolved through an upgrade of a version of one of the at least two members of the set of identified data structures. In some example embodiments, the instruction is partially defined in the set of identified data structures. In some example embodiments, the CPU 501 (i.e., the processor) executes the instruction to determine the set of identified data structures. Operatively connected to the CPU 501 is a commit module 506 to commit to the access of the set of identified data structures as dictated by the instruction. Operatively connected to the CPU 501 is a reversal module 507 to reverse the access of the set of identified data structures, where the version mismatch exists. The reverse can be the reversing of the external affects. Operatively connected to the CPU 501 is an upgrade module 508 to upgrade the version of one of the at least two members of the set of identified data structures. Further, operatively connected to the CPU 501 is a transmitter 509 to propagate a notification of the upgrade across a plurality of nodes.

Figure 6:
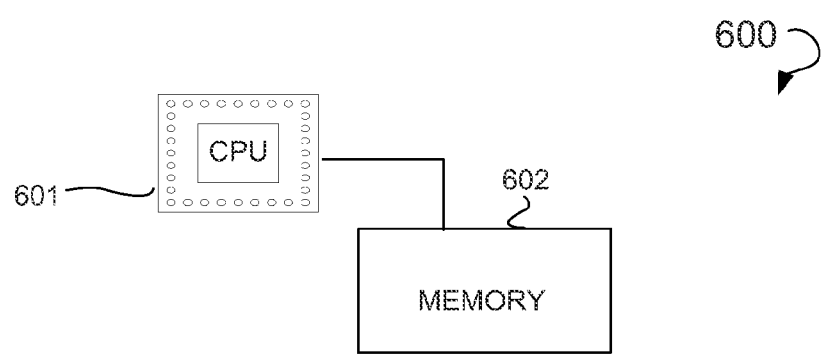
FIG. 6 is a diagram of a computer system, according to an example embodiment, for updating a distributed software system that is implemented across a plurality of nodes, the updating tracked using a version data structure that includes dependencies.

FIG. 6 is a diagram of a computer system 600 for updating a distributed software system that is implemented across a plurality of nodes, the updating tracked using a version data structure that includes dependencies. Shown is a CPU 601 operatively connected to computer readable media (or medium) 602 with logic encoded as CPU executable instruction included in the computer readable media 602. In some example embodiments, the instructions are executed to receive an instruction to access a set of identified data structures, where each identified data structure is associated with a version data structure that includes annotations of particular dependencies amongst at least two members of the set of identical data structures. In some example embodiments, the logic is executed to determine, based upon the dependencies, that a version mismatch exists between the at least two members of the set of identified data structures, the dependencies used to identify a most recent version and a locally cached version of the at least two members. In some example embodiments, the logic is executed to delay execution of the instruction until the version mismatch between the at least two members of the set of identified data structures is resolved through an upgrade of a version of one of the at least two members of the set of identified data structures. In some example embodiments, the instruction is partially defined in the set of identified data structures. Further, in some example embodiments, the logic is executed to execute the instruction to determine the set of identified data structures, and to commit to the access of the set of identified data structures as dictated by the instruction. In some example embodiments, the logic is executed to reverse the access of the set of identified data structures, where the version mismatch exists. Additionally, the logic may be executed to upgrade the version of one of the at least two members of the set of identified data structures, and to propagate a notification of the upgrade across a plurality of nodes.

Figure 7:
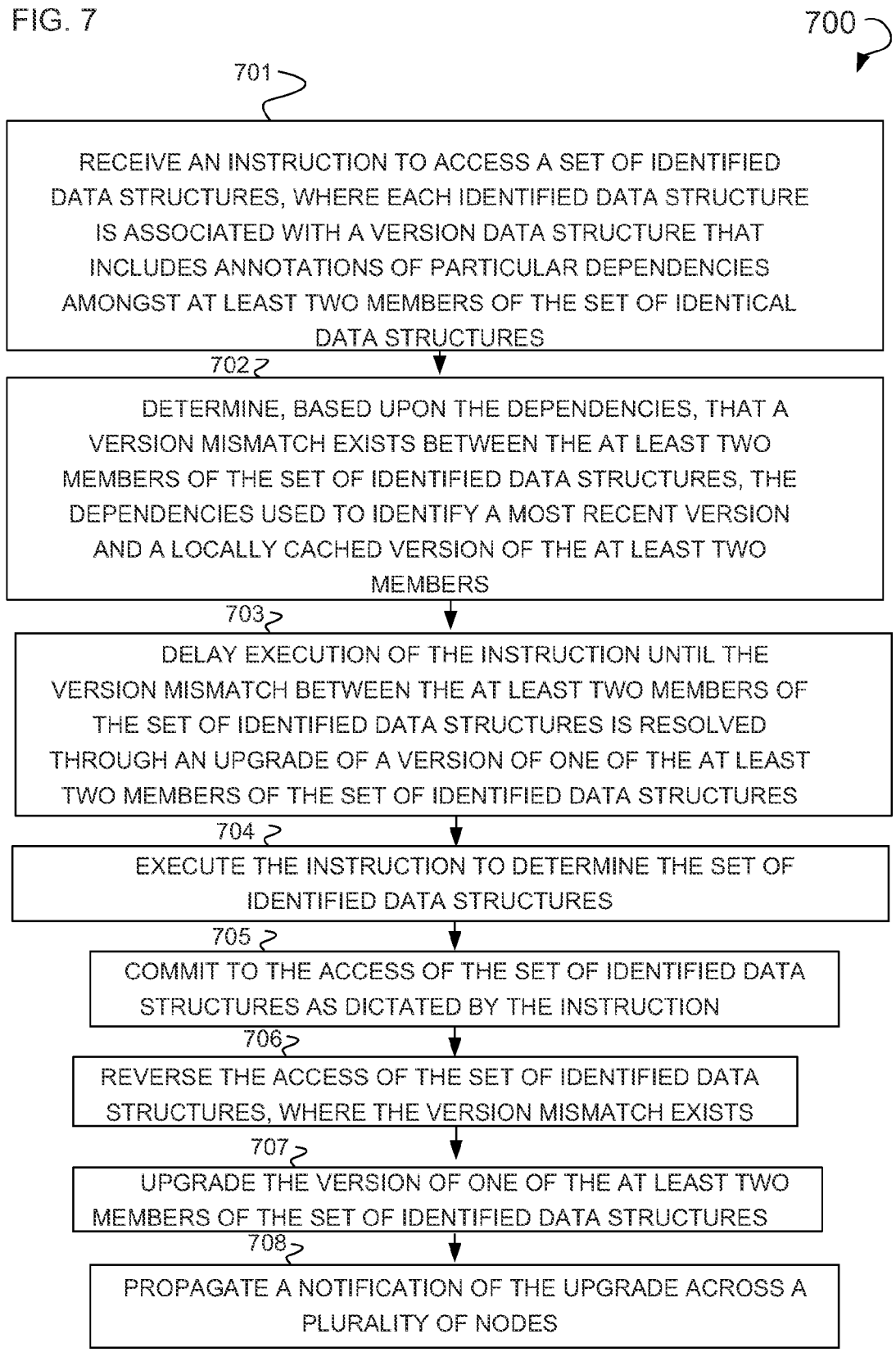
FIG. 7 is a flow chart illustrating a method, according to an example embodiment, for updating a distributed software system that is implemented across a plurality of nodes, the updating tracked using a version data structure that includes dependencies.

FIG. 7 is a flow chart illustrating an example method 700 for updating a distributed software system that is implemented across a plurality of nodes, the updating tracked using a version data structure that includes dependencies. This method 700 may be executed by the nodes 101-103. Operation 701 is executed to receive an instruction to access a set of identified data structures, where each identified data structure is associated with a version data structure that includes annotations of particular dependencies amongst at least two members of the set of identical data structures. Operation 702 is executed to determine, based upon the dependencies, that a version mismatch exists between the at least two members of the set of identified data structures, the dependencies used to identify a most recent version and a locally cached version of the at least two members. Operation 703 is executed to delay execution of the instruction until the version mismatch between the at least two members of the set of identified data structures is resolved through an upgrade of a version of one of the at least two members of the set of identified data structures. In some example embodiments, the instruction is partially defined in the set of identified data structures. Operation 704 executes the instruction to determine the set of identified data structures. Operation 705 is executed to commit to the access of the set of identified data structures as dictated by the instruction. Operation 706 is executed to reverse the access of the set of identified data structures, where the version mismatch exists. Operation 707 is executed to upgrade the version of one of the at least two members of the set of identified data structures. Operation 708 is executed to propagate a notification of the upgrade across a plurality of nodes.

Figure 8:
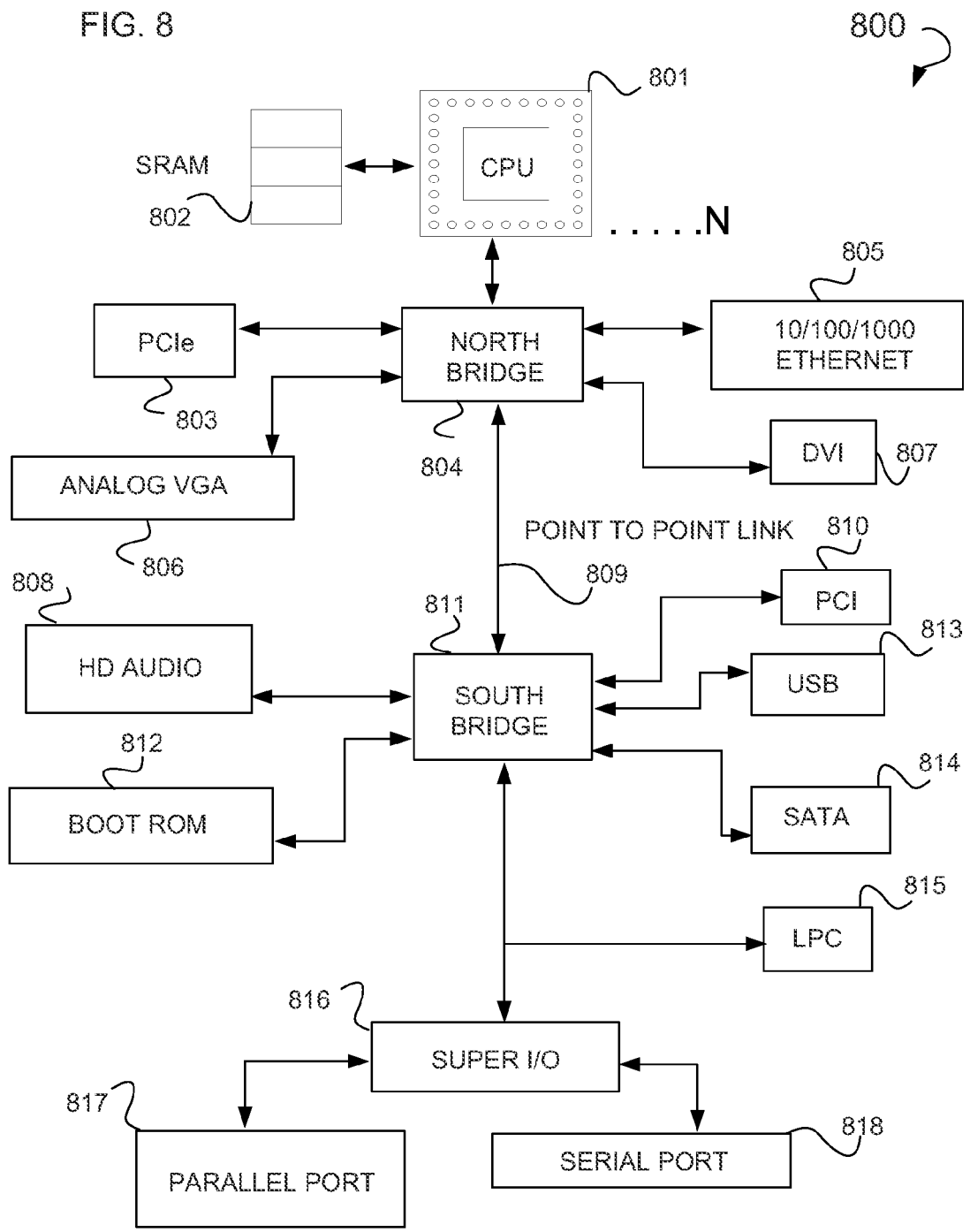
FIG. 8 is a diagram of an example computer system.

FIG. 8 is a diagram of an example computer system 800. Shown is a CPU 801. The processor die 201 may be a CPU 801. In some example embodiments, a plurality of CPU may be implemented on the computer system 800 in the form of a plurality of core (e.g., a multi-core computer system), or in some other suitable configuration. Some example CPUs include the x86 series CPU. Operatively connected to the CPU 801 is Static Random Access Memory (SRAM) 802. Operatively connected includes a physical or logical connection such as, for example, a point to point connection, an optical connection, a bus connection or some other suitable connection. A North Bridge 804 is shown, also known as a Memory Controller Hub (MCH), or an Integrated Memory Controller (IMC), that handles communication between the CPU and PCIe, Dynamic Random Access Memory (DRAM), and the South Bridge. An ethernet port 805 is shown that is operatively connected to the North Bridge 804. A Digital Visual Interface (DVI) port 807 is shown that is operatively connected to the North Bridge 804. Additionally, an analog Video Graphics Array (VGA) port 806 is shown that is operatively connected to the North Bridge 804. Connecting the North Bridge 804 and the South Bridge 811 is a point to point link 809. In some example embodiments, the point to point link 809 is replaced with one of the above referenced physical or logical connections. A South Bridge 811, also known as an I/O Controller Hub (ICH) or a Platform Controller Hub (PCH), is also illustrated. A PCIe port 803 is shown that provides a computer expansion port for connection to graphics cards and associated GPUs. Operatively connected to the South Bridge 811 are a High Definition (HD) audio port 808, boot. RAM port 812, PCI port 810, Universal Serial Bus (USB) port 813, a port for a Serial Advanced Technology Attachment (SATA) 814, and a port for a Low Pin Count (LPC) bus 815. Operatively connected to the South Bridge 811 is a Super Input/Output (I/O) controller 816 to provide an interface for low-bandwidth devices (e.g., keyboard, mouse, serial ports, parallel ports, disk controllers). Operatively connected to the Super I/O controller 816 is a parallel port 817, and a serial port 818.

The SATA port 814 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 802 and/or within the CPU 801 during execution thereof by the computer system 800. The instructions may further be transmitted or received over the 10/100/1000 ethernet port 805, USB port 813 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are implemented as one or more computer-readable or computer-usable storage media or mediums. The storage media include different forms of memory including semiconductor memory devices such as DRAM, or SRAM, Erasable and Programmable Read-Only Memories (EPROMs), Memristor, Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
receiving an instruction to access a set of identified data structures on a first node of a plurality of nodes, each identified data structure being associated with a version data structure that includes annotations that describe dependencies amongst at least two members of the set of identified data structures, the at least two members of the set of identified data structures having respective data structure versions, the annotations specifying the data structure versions on which access to a first one of the set of identified data structures is dependent;
determining, based upon the dependencies, that a version mismatch exists between the at least two members of the set of identified data structures, the dependencies used to identify a most recent data structure version and a locally cached data structure version of the at least two members; and
delaying execution of the instruction until the version mismatch between the at least two members of the set of identified data structures is resolved via an upgrade of a data structure version of one of the at least two members of the set of identified data structures.

2. The computer implemented method of claim 1, wherein the instruction is partially defined in the set of identified data structures.

3. The computer implemented method of claim 1, further comprising:
executing the instruction to access the set of identified data structures; and
committing to the access of the set of identified data structures based on the instruction.

4. The computer implemented method of claim 1, further comprising reversing the access of the set of identified data structures when the version mismatch exists.

5. The computer implemented method of claim 1, further comprising:
upgrading the data structure version of one of the at least two members of the set of identified data structures; and
propagating a notification of the upgrade across the plurality of nodes.

6. A computer system comprising:
a receiver to receive an instruction to access a set of identified data structures on a first node of a plurality of nodes, each identified data structure being associated with a version data structure that includes annotations that describe dependencies amongst at least two members of the set of identified data structures, the at least two members of the set of identified data structures having respective data structure versions, the annotations specifying respective versions on which the access to a first one of the set of identified data structures is dependent;
a mismatch module to determine, based upon the dependencies, that a version mismatch exists between the at least two members of the set of identified data structures, the dependencies used to identify a most recent data structure version and a locally cached data structure version of the at least two members;
a delay module to delay execution of the instruction until the version mismatch between the at least two members of the set of identified data structures is resolved via an upgrade of a data structure version of one of the at least two members of the set of identified data structures; and
a processor to implement at least one of the receiver, the mismatch module, or the delay module.

7. The system of claim 6, wherein the instruction is partially defined in the set of identified data structures.

8. The system of claim 6, further comprising:
a processor to execute the instruction to determine the set of identified data structures; and
a commit module to commit to the access of the set of identified data structures based on the instruction.

9. The system of claim 6, further comprising a reversal module to reverse the access of the set of identified data structures when the version mismatch exists.

10. The system of claim 6, further comprising:
an upgrade module to upgrade the data structure version of one of the at least two members of the set of identified data structures; and
a transmitter to propagate a notification of the upgrade across the plurality of nodes.

11. A computer system comprising:
at least one processor;
a memory in communication with the at least one processor, the memory comprising instructions which, when executed by the at least one processor, cause the at least one processor to at least:
access a first instruction to access a set of identified data structures on a first node of a plurality of nodes, each identified data structure being associated with a version data structure that includes annotations that describe dependencies amongst at least two members of the set of identified data structures, the at least two members of the set of identified data structures having respective data structure versions, the annotations specifying respective versions on which the access to a first one of the set of identified data structures is dependent;
determine, based upon the dependencies, that a version mismatch exists between the at least two members of the set of identified data structures, the dependencies used to identify a most recent data structure version and a locally cached data structure version of the at least two members; and
delay execution of the first instruction until the version mismatch between the at least two members of the set of identified data structures is resolved via an upgrade of a data structure version of one of the at least two members of the set of identified data structures.

12. The computer system of claim 11, wherein the first instruction is partially defined in the set of identified data structures.

13. The computer system of claim 11, wherein the instructions are to further cause the at least one processor to:
execute the instruction to access the set of identified data structures; and
commit to the access of the set of identified data structures based on the instruction.

14. The computer system of claim 11, wherein the instructions are to further cause the at least one processor to reverse the access of the set of identified data structures when the version mismatch exists.

15. The computer system of claim 11, wherein the instructions are to further cause the at least one processor to:
upgrade the data structure version of one of the at least two members of the set of identified data structures; and
propagate a notification of the upgrade across the plurality of nodes.

16. The computer implemented method of claim 1, wherein the annotations specify the members associated with the data structure versions.

17. The computer implemented method of claim 1, wherein the version data structure comprises identifiers of the data structures and indications of locally cached data structure versions.

18. The computer implemented method of claim 17, wherein the annotations that describe the dependencies annotate the identifier of the data structure to which the access is dependent on the members of the set of identified data structures.

* * * * *